United States Patent
Nahmad

(10) Patent No.: US 11,813,549 B1
(45) Date of Patent: Nov. 14, 2023

(54) DEVICES AND METHODS FOR ESSENTIAL OILS, TERPENES, FLAVONOIDS, AND HYDROSOLS EXTRACTION

(71) Applicant: Eco-Logic Environmental Engineering, Inc., Placentia, CA (US)

(72) Inventor: David Nahmad, Placentia, CA (US)

(73) Assignee: Eco-Logic Environmental Engineering Inc., Placentia, CA (US)

(*) Notice: Subject to any disclaimer, the term of this patent is extended or adjusted under 35 U.S.C. 154(b) by 120 days.

(21) Appl. No.: 17/191,565

(22) Filed: Mar. 3, 2021

Related U.S. Application Data

(60) Provisional application No. 62/985,201, filed on Mar. 4, 2020.

(51) Int. Cl.
  *B01D 11/02* (2006.01)

(52) U.S. Cl.
  CPC ...... *B01D 11/0296* (2013.01); *B01D 11/0288* (2013.01); *B01D 11/0219* (2013.01)

(58) Field of Classification Search
  CPC ............ B01D 11/0219; B01D 11/0288; B01D 11/0296
  See application file for complete search history.

(56) References Cited

U.S. PATENT DOCUMENTS

| | | | |
|---|---|---|---|
| 9,950,976 B1 | 4/2018 | Keller | |
| 10,786,750 B1* | 9/2020 | Henry | B01D 5/006 |
| 2009/0233338 A1* | 9/2009 | Jacobs | C07C 67/58 |
| | | | 435/306.1 |
| 2018/0216137 A1* | 8/2018 | Kumaran | C12N 9/0008 |
| 2019/0077781 A1* | 3/2019 | Dijkstra | B01D 11/0296 |
| 2019/0232194 A1 | 8/2019 | Lombardi | |
| 2019/0241537 A1 | 8/2019 | Dramen | |

FOREIGN PATENT DOCUMENTS

| | | | |
|---|---|---|---|
| CN | 110283048 A | 9/2019 | |
| GB | 2501519 | * 10/2013 | ............... C11B 3/00 |
| WO | 2017184642 A1 | 10/2017 | |
| WO | 2019020738 A1 | 1/2019 | |

OTHER PUBLICATIONS

Faust, M., 2018, Technical Data for Cannabinoids, Rocky Mountain Reagents, 6 pp. Available at: <https://www.nwsci.com/customer/docs/SKUDocs/RMR/Technical%20Data_Extractions_03.28.18.pdf>.*
"Winterization and Filtration of cannabis extracts" https://brinstrument.com/blog/, pp. 1-12.
Labarbera, Aaron, "Short Path Distillation 101" Cannabis Tech, Jan. 27, 2020, pp. 1-11.
Romano, Luigi L. et al., "Cannabis Oil: chemical evaluation of an upcoming cannabis-based medicine" Cannabinoids, vol. 7, Issue 1, May 5, 2013, pp. 1-11.
Walsh, Casey, "Cannabis Extraction with Myers Vacuum" Terpenes and Testing Magazine Jan. 27, 2020, pp. 1-12.
"Why winterization stabilizes hash oil extracts" Posted by, HempHacker on Sep. 21, 2015, pp. 1-9, www.hemphacker.com.

* cited by examiner

*Primary Examiner* — Brian A McCaig
(74) *Attorney, Agent, or Firm* — Umberg Zipser LLP

(57) ABSTRACT

Devices, systems, and methods are presented that employ high-surface gaseous solvent extraction of terpenoids, essential oil, and/or flavonoids from a liquid raw material at controlled temperature and pressure conditions. In some embodiments, the extraction is based on a rotary or falling film evaporator in which a steam jet is directed at a heated liquid film of raw material at elevated temperatures and reduced pressure.

20 Claims, 2 Drawing Sheets

DEVICES AND METHODS FOR ESSENTIAL OILS, TERPENES, FLAVONOIDS, AND HYDROSOLS EXTRACTION

This application claims priority to our U.S. Provisional Patent Application with the Ser. No. 62/985,201, which was filed Mar. 4, 2020, and which is incorporated by reference herein.

FIELD OF THE INVENTION

The present disclosure relates to devices, systems, and methods of extraction of volatiles, and particularly of terpenoids, essential oils, and hydrosols from non-aqueous compositions.

BACKGROUND OF THE INVENTION

The background description includes information that may be useful in understanding the present disclosure. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Terpenes and flavonoids comprise a large class of hydrocarbon compounds made from CS isoprene units that are often further combined with other metabolic building blocks to generate a large variety of scaffolds. In addition, various enzymes can add one or more functional groups to produce a large variety of compounds Terpenes are also the largest single class of compounds found in essential oils, also called isoprenoids and are made up of isoprene molecules. Each isoprene molecule (sometimes called isoprene unit) contains five carbon atoms with double bonds. The simplest terpenes are monoterpenes that contain two isoprene molecules. Sesquiterpenes have three isoprene molecules and diterpenes have four. Because each isoprene molecule has five carbon atoms, it is easy to calculate the number of carbon atoms per molecule. Terpenes can be subdivided into groups acyclic or cyclic which indicate their structure. Acyclic terpenes are linear, like the monoterpene β-myrcene. Cyclic terpenes form a ring, like the monoterpene p-cymene. Monocyclic, bicyclic, and tricyclic monoterpenes (containing one, two, or three nonaromatic rings) are frequently found in essential oils. Therefore, and depending on the number of isoprene units, terpenoids can be classified into a variety of groups, including monoterpenes (2 isoprene units, 10 carbon atoms), sesquiterpenes (3 isoprene units, 15 carbon atoms), diterpenes (4 isoprene units, 20 carbon atoms), triterpenes (6 isoprene units, 30 carbon atoms), and tetraterpenes (8 isoprene units, 40 carbon atoms).

Due to their often pleasant aroma/flavor and pharmacological utility, commercial isolation of terpenoids is fairly common and has generally used one of the following procedures: Maceration, steam distillation, and supercritical $CO_2$ extraction. Maceration is an extractive technique that is conducted at room temperature. It involves immersing a plant or comminuted plant material in a solvent (water, oil, alcohol, etc.) typically in an airtight container for a variable time based on the plant material and solvent used. Before being processed, the plant must be properly washed and separated from foreign material. The plant material can then be used fresh or dry, based on the desired product.

Steam distillation is the most prevalent method used to extract and isolate essential oils from plants. This process encompasses the use of a cauldron that contains the plant material (often in a solvent) and steam is forced through the cauldron. The steam then vaporizes the plant material's volatile compounds, which is passed through a condensation process for collection as is described, for example, in US 2019/0232194 and US 2019/0241537. In yet another process, supercritical $CO_2$ is pumped into a chamber filled with plant matter under temperature and pressure conditions where the $CO_2$ is an extremely active solvent. The solvent removes the plant oils and terpenes and is driven out of the vessel by pressure into an expansion chamber where the $CO_2$ volatilizes and leaves the desired products in the vessel.

In yet other examples, short path (wiped film) distillation is a known relatively mild distillation process to isolate terpenoids (see e.g., URL: cannabistech.com/articles/short-path-distillation-101/and in URL: terpenesandtesting.com/myers-vacuum-extraction). Unfortunately, due to the relatively high temperatures required to volatilize terpenoid compounds, thermal degradation and chemical degradation are often encountered that adversely affect product quality.

Thus, even though various method of extraction of terpenoids from plant materials are known in the art, all or almost all of them suffer from various disadvantages. Consequently, there is a need to provide improved compositions and methods that help isolate terpenoid and related compounds in a simple and effective manner and that preserves integrity of the desired materials.

SUMMARY OF THE INVENTION

Various devices, systems, and methods are presented that enable extraction of value products from crude oils in a conceptually simple and efficient manner that preserve integrity of the value product and residuum.

In one aspect, the inventors contemplate extraction device that includes a sample receiving compartment that is fluidly coupled to a contact surface, wherein the contact surface is configured to retain a thin film of a fluid comprising a value product. A solvent source is configured to generate from a liquid solvent a gaseous solvent phase, and a conduit is configured to deliver the gaseous solvent phase to the thin film on the contact surface. A condenser is then fluidly coupled to the extraction device and configured to receive and condense the gaseous solvent phase and value product. Most typically, the extraction device is used and configured for extraction of terpenes, essential oils, and/or flavonoids from a hemp or *cannabis* crude oil Contemplated devices may be configured as modified rotary evaporators, modified falling film evaporators, or as counter-current extraction column. Therefore, the contact surface may be a portion of a round bottom flask, an inside surface of a cylinder, or a packing material. Preferably the thin film has a thickness of equal or less than 1 mm, and the solvent predominantly comprises water and a slight volume of other polar and non-polar solvents like water, alcohols, ketones or halogenated solvents.

Therefore, in another aspect of the inventive subject matter, the inventors also contemplate a method of extracting a value product from a crude oil that includes a step of forming a thin film of the crude oil, and a further step of contacting the thin film with a gaseous solvent to thereby entrain at least some of the value product in the gaseous solvent. In a still further step, the gaseous solvent and entrained value product are condensed.

Typically, but not necessarily, the film is formed in a rotating round bottom flask, on an inside surface of a cylinder, or on a packing material. Moreover, it is generally preferred that the contacting is performed at reduced pressure and/or at elevated temperature. Typically, contemplated methods will also include a step of separating the condensed gaseous solvent and the entrained value product via phase separation.

For example, a method of extracting terpenes from a hemp or *cannabis* crude oil will include a step of forming a thin film of the hemp or *cannabis* crude oil, and a step of contacting the thin film with a gaseous solvent to thereby entrain at least some of the value product in the gaseous solvent. The gaseous solvent and entrained value product are then condensed for product recovery. Preferably, the film is formed in a rotating round bottom flask, on an inside surface of a cylinder, or on a packing material, and the contacting is performed at reduced pressure and/or elevated temperature while the gaseous solvent predominantly comprises water.

Various objects, features, aspects, and advantages will become more apparent from the following detailed description of preferred embodiments, along with the accompanying drawing in which like numerals represent like components.

DETAILED DESCRIPTION

Figure 1:
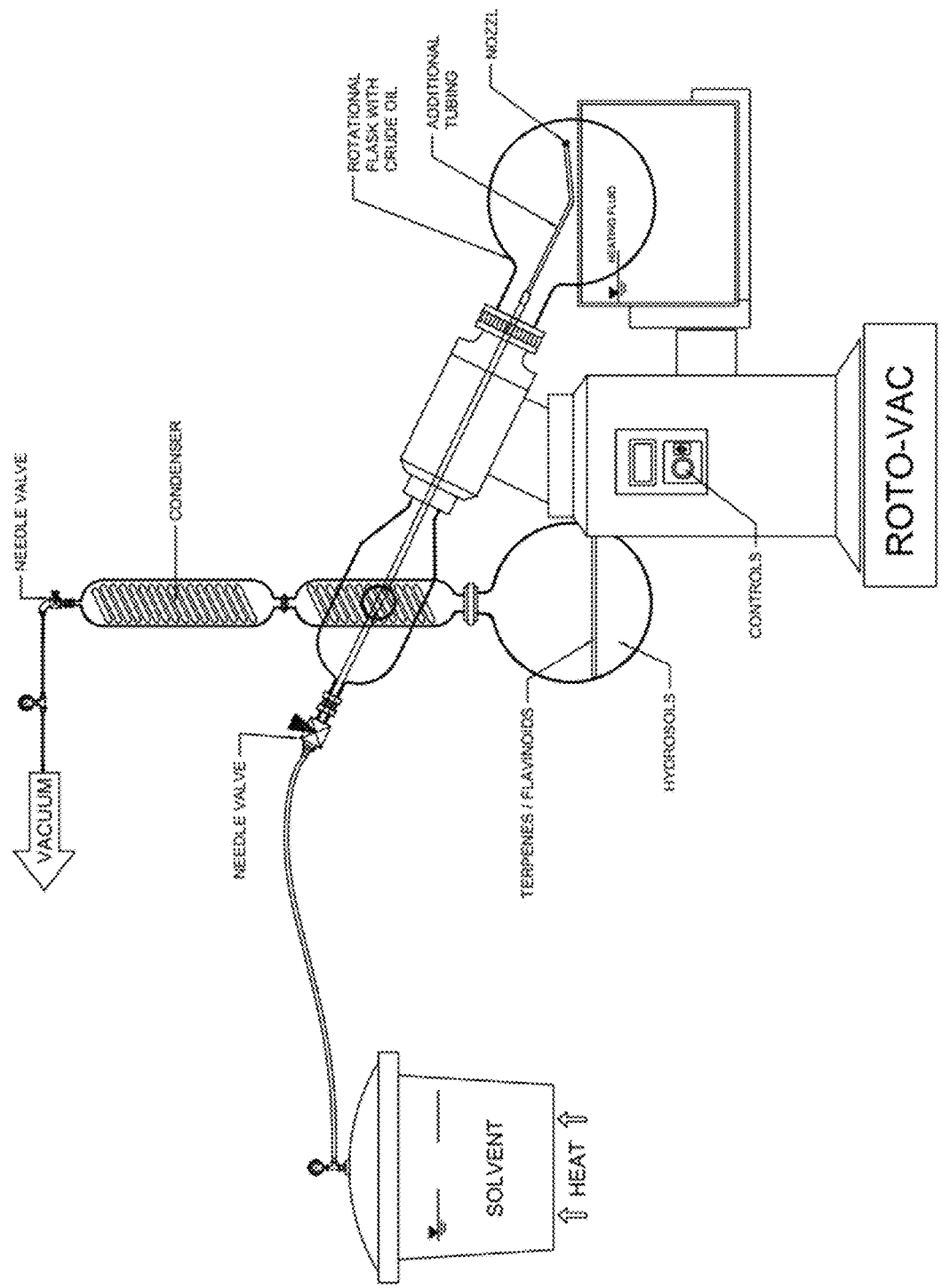
FIG. 1 is an exemplary rotary evaporation and extraction device according to the inventive subject matter.

The inventors have discovered that extraction of various value products, and especially terpenoids, flavonoids, and other desirable volatile compounds from plant materials can be significantly improved by processing a plant extract/oil of the plant materials that include the value product in a device that forms a large surface area of the plant extract/oil. That surface area is then subjected to exposure with a solvent in gaseous phase (e.g., steam). Most typically, the plant extract/oil is heated to an elevated temperature (e.g., above 20° C.) and/or under reduced pressure (e.g., below 760 Torr) while forming the large surface area. Preferably, the large surface area is generated by a film forming process (e.g., via adhesion, rotation, wiping, spraying onto a surface, use of an overflow weir, etc.). In further typical embodiments, the solvent in gaseous phase is directed against the large surface area and withdrawn from the device after contact with the large surface area for condensation and separation of the value product.

For example, in one embodiment of the inventive subject matter, a "crude oil" is extracted from a plant material such as hemp or *cannabis*, typically using a solvent mix of polar and non-polar compounds. Among other choices, suitable solvents include single solvents (e.g., methylene chloride, toluene, ethanol, diethyl ether, acetone, etc.) and solvent mixtures (e.g., methylene chloride, acetone, ethanol), and depending on the particular type of value product to be extracted, the person of ordinary skill in the art will be readily apprised of the appropriate choice of solvent. For example, in preferred embodiments the crude oil is prepared using a mixture of non-flammable solvents based on halogenated hydrocarbons (e.g., 65% to 85%), highly polar compounds such as various alcohols (R—OH) and/or ketones (R(=O)—R'') (e.g., 5% to 10%) and ethers (R—O—R') (e.g., 7% to 18%) with R, R', and R'' independently being an alkyl or alkenyl, optionally substituted, to remove all or most water soluble compounds. Viewed form a different perspective, suitable mixtures can be determined by the affinity of the Hansen Parameters (Polar, Hydrogen Bonding, and Dispersion Solubility parameters) to the target compounds both on the hydrophilic and hydrophobic phases. Moreover, it is further preferred (but not required) that where the hydrophobic solvent is a mixture, the mixture is an azeotropic mixture and is preferably non-flammable.

After suitable time and processing (e.g., using agitation, maceration, sonication, etc.) for extraction, and after removal of the solvent mix, the remaining "crude oil" will contain the hemp or *cannabis* terpenes and flavonoids plus many other materials like lipids, tars, and other active ingredients. As will be readily appreciated, the crude oil may contain residual quantities of water and other solvents from the extraction process, typically in an amount of equal or less than 10 wt %, or equal or less than 8 wt %, or equal or less than 6 wt %, or equal or less than 4 wt %, or equal or less than 3 wt %, or equal or less than 2 wt %, or equal or less than 1 wt %.

This "crude oil" can now serve as feed material to the inventive process in which the terpenes, flavonoids, and/or essential oils can be extracted using partial vacuum (e.g., less than 700 Torr, or less than 500 Torr, or less than 300 Torr, or less than 200 Torr, or less than 100 Torr) and a solvent in a gaseous form, for example, water, alcohol, a hydrocarbon, or a ketone, or any reasonable combination thereof. Moreover, it should be appreciated that the crude oil will be heated to an elevated temperature (e.g., at least 25° C., or at least 35° C., or at least 45° C., or at least 55° C., or at least 65° C.) to further facilitate recovery of the value products. Most typically, the solvent gas is directed into/onto a thin film of the crude oil while under partial vacuum, preferably using a jet, nozzle, or other opening that forces the solvent gas against/into the thin film of the crude oil. As will be readily appreciated, the specific configuration of the device can be adapted for the particular type of extraction and value product.

Figure 2:
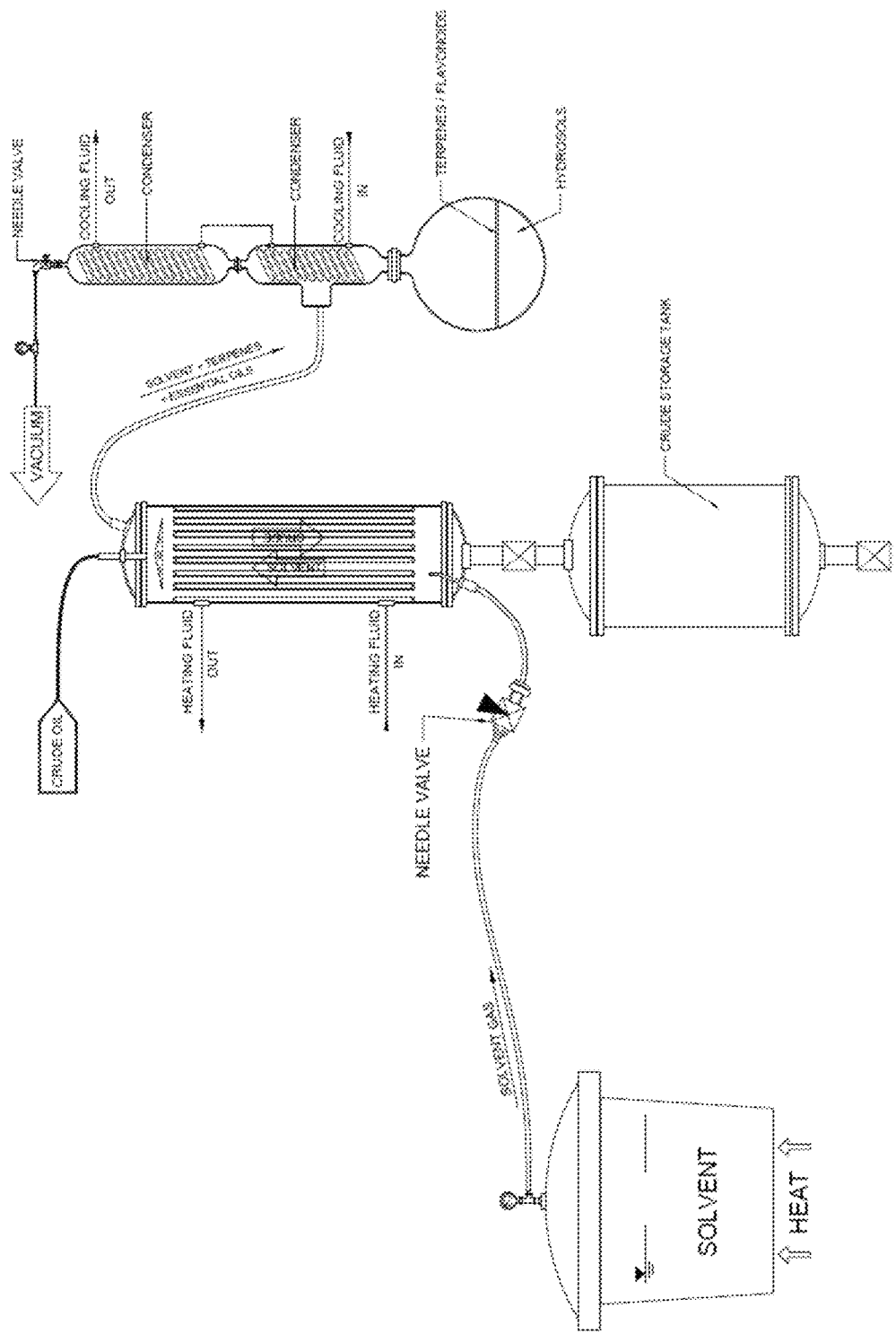
FIG. 2 is an exemplary falling film evaporation and extraction device according to the inventive subject matter.

Among other suitable devices, a commercial rotary evaporator can be modified to provide the configuration and the solvent gas delivery (gas blasting) capabilities as is exemplarily shown in FIG. 1. Here, the solvent is vaporized and injected through a nozzle onto the surface of the crude oil film that is moving in the inside surface of the rotating flask that is held under vacuum. At these conditions (i.e., heated thin film at reduced pressure) the gas phase solvent and dissolved/entrapped value product exit towards the vacuum pump and will be condensed in the condenser coils and fall into the receiving flask. The so produced condensate will settle in the form of hydrosols (solvent and solutes in liquid phase) and value products (e.g., essential oils/terpenes/flavonoids) will rise to the surface as they are typically lighter than the solvent fraction. Alternatively, it is contemplated that a falling film evaporator can be modified such that the solvent in gas phase is blasted at or near the bottom of the evaporator forcing a counter flow against the heated crude flowing downwards in a reduced pressure device as is exemplarily depicted in FIG. 2. Where desired, the crude oil can be recirculated to more complete extraction, or a subsequent extraction with different solvent and/or extraction conditions.

As will be readily appreciated, contemplated devices and methods will advantageously increase the surface interaction between the crude oil and the gaseous solvent to enhance extraction. In addition, as the extraction is typically performed at reduced pressure and elevated temperature, significantly milder conditions are encountered by the value product and less thermal and/or oxidative degradation products will be present. Moreover, contemplated devices and methods are more efficient than conventional devices and methods as contemplated devices and methods will not process the whole bulk of plant material and require significantly less energy for extraction as the extraction is performed from crude oil that is in most cases only from 5% to 14% of the total weight of the plant material. For example, it is generally contemplated that a total amount of impurities formed from thermal degradation of the value product (e.g., terpenes, essential oils, and/or flavonoids) is equal or less than 10 wt %, or equal or less than 8 wt %, or equal or less than 6e wt %, or equal or less than 5 wt %, or qual or less than 4 wt %, or equal or less than 3 wt %, or equal or less than 2 wt %, or equal or less than 1 wt % in the condensed value product (e.g., terpenes, essential oils, and/or flavonoids). Likewise, it is contemplated that the value product (e.g., terpenes, essential oils, and/or flavonoids) have a purity of at least 30%, or at least 40%, or at least 50%, or at least 60%, or at least 70%, or at least 80%, or at least 90% purity in the condensed value product (e.g., terpenes, essential oils, and/or flavonoids).

Of course, it should be appreciated that numerous manners other than rotary evaporators and falling film evaporators are deemed suitable for use herein, and especially contemplated devices and methods of forming a high-surface area include use of blades, spinning surfaces, or other implements to generate a thin film. Where desired, contemplated devices and methods may also produce drops or droplets, for example, using one or more nozzles through which the crude oil is passed (typically at high pressure). In yet other embodiments, high surface area may be produced in packed or structured columns that have internals (e.g., Raschig, Bialecki, or Pall rings, etc.) that increase the surface area of a liquid passing through the column, typically in a downward motion that is counter current to the solvent in gaseous phase. Thus, and viewed from a different perspective, contemplated devices and methods will form a thin film from the crude oil while the crude oil in moving, and/or while the crude oil remains on a stationary phase as a moving implement moves relative to the stationary phase (e.g., wiper blade over heated surface).

Depending on the particular device and operating condition, it should be appreciated that the thickness of the thin film may vary considerably. However, in most embodiments, the thin film will have a thickness of at least 1 μm, at least 10 μm, at least 50 μm, at least 100 μm, at least 200 μm, at least 300 μm, at least 400 μm, at least 500 μm, at least 600 μm, at least 700 μm, at least 800 μm, at least 900 μm, or at least 1 mm, or at least 2 mm, or at least 3 mm, or at least 5 mm, and in some cases even more. For example, suitable film thickness can be between 10 and 100 μm, or between 100 and 500 μm, or between 500 and 1,000 μm, or between 1-3 mm, and even thicker.

With respect to the delivery of the solvent in the gas phase it should be appreciated that the specific delivery will at least in part depend on the particular configuration of the devices contemplated herein. For example, where the device is a packed column, the solvent in the gas phase is typically delivered in a countercurrent flow relative to the flow of the crude oil. On the other hand, where the device is a falling film or rotary evaporator, the solvent in the gas phase may be directed to the thin film via one or more nozzles or directional devices (e.g., tubes, air curtain, etc.). However, in less preferred aspects at least a portion of the solvent in the gas phase may also be directly fed into the bulk of the crude oil before film formation.

Most typically, the solvent for contemplated devices will be a solvent or solvent mixture that is immiscible with the value product (e.g., essential oils/terpenes/flavonoids) and that is non-reactive with the value product and residual components of the crude oil. For example, preferred solvent and solvent mixtures include water, various alcohols (e.g., methanol, ethanol, isopropanol, etc.), hydrocarbons (e.g., hexane, benzene, etc.), petroleum ether, or a ketone (e.g., acetone), and any reasonable mixture thereof. As will be readily appreciated, the solvent or solvent mixture may be converted to the gas phase in a variety of ways, however, it is generally preferred that the solvent or solvent mixture is heated to or beyond the boiling point to generate the gas phase. Once in the gas phase, the solvent can then be brought into contact with the thin film of the crude oil and/or the crude oil, using a gas conduit, nozzle, or directional implement. Such process can use a compressor, where desired.

In still further contemplated aspects, it is noted that the crude oil and/or the thin film will be heated to a temperature above ambient temperature such as at least 20° C., or at least 30° C., or at least 50° C., or at least 70° C., or at least 90° C., or at least 130° C., or at least 150° C., or at least 170° C., or even higher. Therefore, suitable temperature ranges include those between 20 and 40° C., or between 40 and 80° C., or between 80 and 100° C., or between 100 and 150° C., and in some cases even between 150 and 200° C. The person of ordinary skill will be readily able to adjust the temperature as a function of starting material, pressure, desired degree of recovery, type of recovered compound, etc. Most typically, however, the temperature will be selected such that the isolated value product will not undergo thermal and/or oxidative degradation (or no more than 7%, or no more than 5%, or no more than 3%, or no more than 2%, or no more than 1%). Of course, it should also be noted that the temperature need not be constant but may be increased in an isocratic gradient or step gradient).

With respect to suitable pressures it is generally preferred that the pressure in the device (or at least portion of the device where the thin film contacts the gaseous solvent) is below ambient pressure. Therefore, suitable pressures include pressure ranges between 760 and 700 Torr, or between 760 and 700 Torr, or between 700 and 500 Torr, or between 500 and 300 Torr, or between 300 and 100 Torr, or between 100 and 50 Torr, or between 50 and 10 Torr, and even lower. As will be appreciated, suitable pressure or pressure ranges can be established by analysis of the value product yield and/or composition, alone or in combination with proper temperature control.

There are numerous starting materials suitable for use in conjunction with the teachings presented herein, and particularly preferred starting materials are derived from plant materials. Most typically, such starting material is or comprises a solvent-extracted or solvent-extractable fraction of a plant. Most typically, but not necessarily the plants will have nutritional value, pharmaceutical value, or value in the production of cosmetic products. Viewed from another perspective, the starting material will typically be an extract from a (dried or fresh) plant material where the solvent is typically immiscible with water (or is miscible with water at least than 1 mL/L or less). For example, the solvent in some embodiments may be a non-flammable mixture of several compounds based on a halogenated hydrocarbon body (65% to 85%, such as methylene chloride), a highly polar compound like R—OH (such as methanol or ethanol) or R—O—R" (ketone such as acetone, 5% to 10%) to remove all water soluble compounds and ether (R—O—R' such as diethylether 7% to 18%).

Additionally, it is generally preferred that the crude oil will contain no or little residual solvent. Thus, it should be appreciated that the crude oil is typically a hydrophobic extract from which the extracting solvent has been at least partially and most typically completely removed. For example, suitable crude oils include hemp and/or *cannabis* crude oils, oils from edible plants (e.g., clove, mint, carraway seed, etc.), oils from plants used in the cosmetic industry (e.g., lavender, rose, jasmine, hyacinth, etc.), and/or oils used in the preparation of pharmaceuticals (e.g., *eucalyptus*, etc.). Exemplary compositions and methods suitable for use herein are described in U.S. 63/135,135, filed Jan. 8, 2021, and incorporated by reference herein.

Operation of the devices contemplated herein will typically proceed to completion of extracting the desired value product, or substantial completion (e.g., at least 80% total yield, or at least 90% total yield, or at least 95% total yield). Flow rates of gaseous solvent will typically depend on the volume of crude oil, surface area suitable for contact with the gaseous solvent, and type of solvent used. As will be recognized the vapor and dissolved/entrapped value product will be condensed in a manner suitable for the specific device, and phase separation of the solvent from the value product can be performed passively by settling or in an active manner (e.g., centrifugal separation).

EXAMPLES

In one typical example, crude oil was prepared from fresh *cannabis* by comminuting the plant materials and contact of the so comminuted materials with a solvent mixture that predominantly comprised methylene chloride along with minor quantities of acetone, ethanol, and ethyl ether. After a contact period of about 1 week, the solvent mixture was removed from the plant material, evaporated, and condensed for further use. The so prepared crude oil was then charged into a rotary evaporator as shown in FIG. 1 and the thin film formed at the inner surface of the rotating bulb was subjected to a steam jet under reduced pressure (less than 100 Torr) and elevated temperature (about 90° C.). The vapor and entrained and volatilized terpenes were then condensed in a condenser and collected as a two-phase product. After separation of the terpenes in the top layer from the condensed solvent, the terpene product was a clear and colorless liquid. Chemical analysis of the terpene product was as shown in Table 1.

| UNIT OF MEASUREMENT: Milligrams per Gram(mg/g) | | | |
|---|---|---|---|
| ANALYTE | RESULT | LOD | LLOQ |
| 3-Carene | ND | 0.4785 | 0.9569 |
| Alpha cedrene | ND | 0.4785 | 0.9569 |
| Alpha pinene | 25.29 mg/g (2.529%) | 0.4785 | 0.9569 |
| Alpha terpineol | <LLOQ | 0.4785 | 0.9569 |
| Beta caryophyllene | 27.29 mg/g (2.729%) | 0.4785 | 0.9569 |
| Beta pinene | 16.82 mg/g (1.682%) | 0.4785 | 0.9569 |
| Borneol | ND | 0.4785 | 0.9569 |
| Camphor | ND | 0.4785 | 0.9569 |
| Cis nerolidol | ND | 0.4785 | 0.9569 |
| Fenchol | 2.957 mg/g (0.2957%) | 0.4785 | 0.9569 |
| Gamma terpinene | <LLOQ | 0.4785 | 0.9569 |

| UNIT OF MEASUREMENT: Milligrams per Gram(mg/g) | | | |
|---|---|---|---|
| ANALYTE | RESULT | LOD | LLOQ |
| Geranyl acetate | ND | 0.4785 | 0.9569 |
| Isoborneol | ND | 0.4785 | 0.9569 |
| Limonene | 46.97 mg/g (4.697%) | 0.4785 | 0.9569 |
| Menthol | ND | 0.4785 | 0.9569 |
| P-mentha-1,5-diene | ND | 0.4785 | 0.9569 |
| Sabinene | ND | 0.4785 | 0.9569 |
| Trans beta ocimene | 2.825 mg/g (0.2825%) | 0.4785 | 0.9569 |
| Trans nerolidol | ND | 0.4785 | 0.9569 |
| Alpha bisabolol | ND | 0.4785 | 0.9569 |
| Alpha humulene | 7.623 mg/g (0.7263%) | 0.4785 | 0.9569 |
| Alpha terpinene | ND | 0.4785 | 0.9569 |
| Alpha terpinolene | 6.741 mg/g (0.6741%) | 0.4785 | 0.9569 |
| Beta myrcene | 431.1 mg/g (43.11%) | 0.4785 | 0.9569 |
| Beta terpineol | ND | 0.4785 | 0.9569 |
| Camphene | 1.190 mg/g (0.1190%) | 0.4785 | 0.9569 |
| Caryophyllene oxide | <LLOQ | 0.4785 | 0.9569 |
| Cis beta ocimene | 46.19 mg/g (4.619%) | 0.4785 | 0.9569 |
| Eucalyptol | <LLOQ | 0.4785 | 0.9569 |
| Fenchone | ND | 0.4785 | 0.9569 |
| Gamma terpineol | ND | 0.4785 | 0.9569 |
| Guaiol | ND | 0.4785 | 0.9569 |
| Isopulegol | ND | 0.4785 | 0.9569 |
| Linalool | 1.340 mg/g (0.1340%) | 0.4785 | 0.9569 |
| P-cymene | ND | 0.4785 | 0.9569 |
| Pulegone | ND | 0.4785 | 0.9569 |
| Sabinene hydrate | ND | 0.4785 | 0.9569 |
| Trans gerinol | ND | 0.4785 | 0.9569 |
| Valencene | 2.033 mg/g (0.2033%) | 0.4785 | 0.9569 |

ADDITIONAL INFORMATION:
Method: SOP-TECH-027
Instument: GC-MS-FID
Sample Prepped Jan. 10, 2020 18:21
Sample Analyzed Jan. 10, 2020 19:04
Sample Approved Jan. 13, 2020 13:06

Therefore, it should be appreciated that contemplated systems, devices, and methods will advantageously allow for production of a variety of desirable products, and especially terpenes, essential oils, flavonoids, and hydrosols (hydrophilic compounds) that can be obtained from the condensate. As will be readily appreciated, these desirable products will typically be complex mixtures of individual compounds, which can be further processed to isolated one or more individual components (or less complex mixtures thereof). The so isolated products can then be used to flavor various consumables, including beverages, vape juices, candles, etc. While not limiting to the inventive subject matter, the solvent in most cases will be mostly water (e.g., at least 80 vol %, or at least 85 vol %, or at least 90 vol %, or at least 95 vol %, or at least 98 vol %) but may contain further solvents (polar and non-polar). Moreover, it should be noted that the so processed crude oil is still a valuable commodity from which one or more major valuable components can be extracted in one or more downstream processes (e.g., various cannabinoids such as cannabidiol or tetrahydrocannabinol where the crude oil was obtained from hemp or *cannabis*).

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the full scope of the present disclosure, and does not pose a limitation on the scope of the invention otherwise claimed. No language in the specification should be construed as indicating any non-claimed element essential to the practice of the claimed invention.

It should be apparent to those skilled in the art that many more modifications besides those already described are possible without departing from the full scope of the concepts disclosed herein. The disclosed subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. An extraction device for terpenes, essential oils, and/or flavonoids from a hemp crude oil or a *cannabis* crude oil, comprising:
    a rotary evaporator further comprising
    a sample receiving compartment containing or comprising a contact surface, wherein the contact surface is configured to retain a thin film of the hemp or *cannabis* crude oil that comprises terpenes, essential oils, and/or flavonoids;
    a solvent source configured to generate from a liquid solvent a gaseous solvent phase;
    a conduit fluidly coupled to the solvent source and the sample receiving compartment and configured to deliver the gaseous solvent phase from the solvent source to the contact surface; and
    a condenser configured to receive and condense the gaseous solvent phase and any entrained terpenes, essential oils, and/or flavonoids therein after delivery of the gaseous solvent phase to said contact surface.

2. The extraction device of claim 1 wherein the contact surface is a portion of a round bottom flask.

3. The extraction device of claim 1 wherein the contact surface is a plurality of vertically arranged plates in a contact vessel.

4. The extraction device of claim 1 wherein the contact surface is a packing material of a counter-current contact column.

5. A method of extracting a value product contained in a plant-based crude oil, wherein the value product is a product other than a cannabinoid, and wherein the crude oil is a solvent extraction product from the plant from which the solvent has been removed and contains no added dispersing medium, comprising
    forming on a contact surface a thin film of the crude oil;
    contacting the thin film on the contact surface with a gaseous solvent to thereby entrain at least some of the value product in the gaseous solvent;
    removing the gaseous solvent and entrained value product from the contact surface; and
    condensing the gaseous solvent and entrained value product.

6. The method of claim 5 wherein the film is formed in a rotating round bottom flask, on a plurality of vertically arranged surfaces in a contact vessel, or on a packing material in a counter-current contact column.

7. The method of claim 5 wherein the contacting is performed at reduced pressure.

8. The method of claim 5 wherein the contacting is performed at elevated temperature.

9. The method of claim 5 further comprising a step of separating the condensed gaseous solvent from the entrained value product via phase separation.

10. A method of extracting terpenes, essential oils, and/or flavonoids from a hemp crude oil or a *cannabis* crude oil, wherein the crude oil is a solvent extraction product from hemp or *cannabis* from which the solvent has been removed and contains no added dispersing medium, comprising:
    forming on a contact surface a thin film of the hemp or *cannabis* crude oil;
    contacting the thin film on the contact surface with a gaseous solvent to thereby vaporize and entrain at least some of the terpenes, essential oils, and/or flavonoids in the gaseous solvent;
    removing the gaseous solvent and entrained terpenes, essential oils, and/or flavonoids from the contact surface; and
    condensing the gaseous solvent and entrained terpenes, essential oils, and/or flavonoids.

11. The method of claim 10 wherein the film is formed by rotating a round bottom flask that is partially filled with the crude oil, by passing the crude oil along a plurality of vertically arranged surfaces in a contact vessel, or by flowing the crude oil over a packing material in a counter contact column.

12. The method of claim 10 wherein the film has a thickness of 1 µm-1 mm.

13. The method of claim 10 wherein the crude oil is produced from extraction of hemp or *cannabis* using an organic solvent extraction process.

14. The method of claim 10 wherein the contacting is performed at reduced pressure and/or elevated temperature.

15. The method of claim 10 wherein the gaseous solvent comprises water vapor.

16. The method of claim 10 wherein a total amount of impurities formed from thermal degradation of the terpenes, essential oils, and/or flavonoids is equal or less than 5 wt % in the condensed terpenes, essential oils, and/or flavonoids.

17. The method of claim 10 wherein the terpenes, essential oils, and/or flavonoids have a purity of at least 65% purity in the condensed terpenes, essential oils, and/or flavonoids.

18. A method of extracting terpenes, essential oils, and/or flavonoids from a hemp or *cannabis* crude oil, comprising:
    forming on a contact surface a thin film of the hemp or *cannabis* crude oil;
    contacting the thin film on the contact surface with a gaseous solvent to thereby vaporize and entrain at least some of the terpenes, essential oils, and/or flavonoids in the gaseous solvent;
    removing the gaseous solvent and entrained terpenes, essential oils, and/or flavonoids from the contact surface; and
    condensing the gaseous solvent and entrained terpenes, essential oils, and/or flavonoids,
    wherein the contacting is performed at reduced pressure and/or elevated temperature, and
    wherein the reduced pressure is between 10 and 700 Torr and/or wherein the elevated temperature is between 30 and 65° C.

19. The method of claim 18 wherein the gaseous solvent comprises water vapor.

20. The method of claim 18 wherein a total amount of impurities formed from thermal degradation of the terpenes, essential oils, and/or flavonoids is equal or less than 5 wt % in the condensed terpenes, essential oils, and/or flavonoids.

\* \* \* \* \*